United States Patent
Berke et al.

(10) Patent No.: US 7,458,600 B1
(45) Date of Patent: Dec. 2, 2008

(54) CART AND BAG CARRIER

(76) Inventors: Joseph J. Berke, 2063 Long Lake Shore, West Bloomfield, MI (US) 48323; Charles T. Michael, 5698 Firwood, Troy, MI (US) 48098

(*) Notice: Subject to any disclaimer, the term of this patent is extended or adjusted under 35 U.S.C. 154(b) by 1015 days.

(21) Appl. No.: 09/207,634

(22) Filed: Dec. 9, 1998

(51) Int. Cl.
*B62B 1/22* (2006.01)
(52) U.S. Cl. ............... 280/651; 280/DIG. 3; 280/47.35
(58) Field of Classification Search .......... 280/30, 280/40, 638, 35, 654, 655, 655.1, 43.1, 47.131, 280/47.17, 47.19, 47.2, 47.26, 47.28, 47.29, 280/47.315, 47.34, 47.35, 651, 652; 248/95, 248/97, 98, 99, 100, 101
See application file for complete search history.

(56) References Cited

U.S. PATENT DOCUMENTS

| | | | | |
|---|---|---|---|---|
| 524,041 | A * | 8/1894 | Harmon et al. | 248/98 |
| 2,384,697 | A * | 9/1945 | Riccardi | 606/120 |
| 2,610,071 | A * | 9/1952 | Davis et al. | 280/36 |
| 2,718,404 | A * | 9/1955 | Burskey | 280/659 |
| 2,802,672 | A * | 8/1957 | D Angelo | 280/40 |
| 3,400,942 | A * | 9/1968 | Hull | 280/39 |
| 3,597,813 | A * | 8/1971 | Takahashi et al. | 24/67.5 |
| 3,662,803 | A * | 5/1972 | Kuvik | 383/42 |
| 3,879,813 | A * | 4/1975 | Shadwell | 24/455 |
| 3,888,442 | A * | 6/1975 | Comeaux | 248/98 |
| 3,964,763 | A * | 6/1976 | Stelniceanu | 280/47.17 |
| 4,044,784 | A * | 8/1977 | Smith | 135/67 |
| 4,124,185 | A * | 11/1978 | Preisinger | 248/98 |
| 4,160,557 | A * | 7/1979 | Taylor | 280/652 |
| 4,261,447 | A * | 4/1981 | Arias et al. | 190/18 A |
| 4,315,632 | A * | 2/1982 | Taylor | 280/40 |
| 4,448,434 | A * | 5/1984 | Anderson | 280/40 |
| 4,452,468 | A * | 6/1984 | Eads et al. | 280/641 |
| 4,950,003 | A * | 8/1990 | Holtz | 280/655 |
| 4,989,889 | A * | 2/1991 | Perez | 280/40 |
| 5,009,657 | A * | 4/1991 | Cotey et al. | 606/120 |
| 5,301,393 | A * | 4/1994 | Brown | 24/67.7 |
| 5,468,005 | A * | 11/1995 | Yang | 280/40 |
| 5,533,236 | A * | 7/1996 | Tseng | 24/67.5 |
| 5,621,950 | A * | 4/1997 | White | 24/67.5 |
| 5,697,624 | A * | 12/1997 | Faraj | 280/47.19 |
| 5,951,037 | A * | 9/1999 | Hsieh et al. | 280/655 |

FOREIGN PATENT DOCUMENTS

IT 574172 * 3/1958 ............ 280/DIG. 3

* cited by examiner

*Primary Examiner*—Christopher P. Ellis
*Assistant Examiner*—Bridget Avery
(74) *Attorney, Agent, or Firm*—Alex Rhodes

(57) ABSTRACT

A carrier mounted on a cart for transporting a bag or a sack containing loose or granular materials. The carrier is comprised of a pair of jaws having gripping surfaces for retaining an upper portion of a bag or sack and a handle for carrying the bag or sack in a slightly elevated position or by dragging on a surface. In a first aspect of the invention, the gripping surfaces are formed by shearing and bending a plurality of triangular tabs in metal strips which are attached to the jaws. In a second aspect of the invention, the carrier is attached to a 2-wheel cart in a manner which allows the carrier to be used in combination with the cart or detached and used independently.

10 Claims, 6 Drawing Sheets

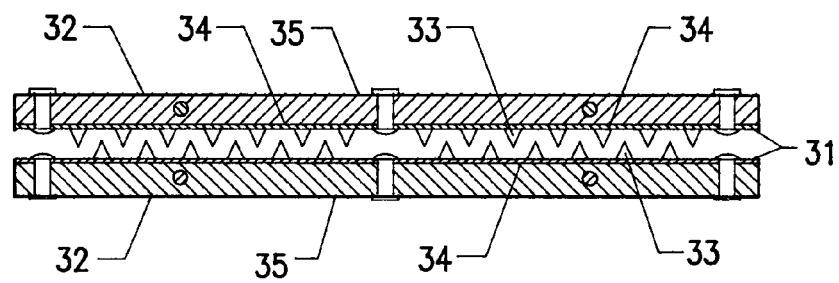
FIG. 4
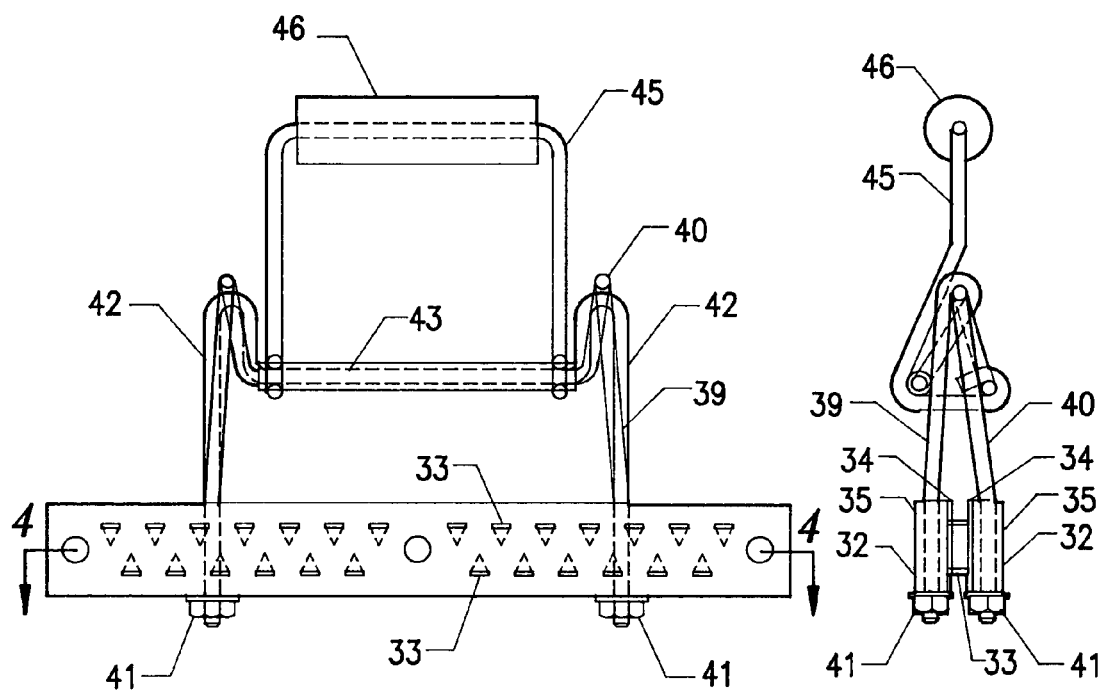
FIG. 1
FIG. 2

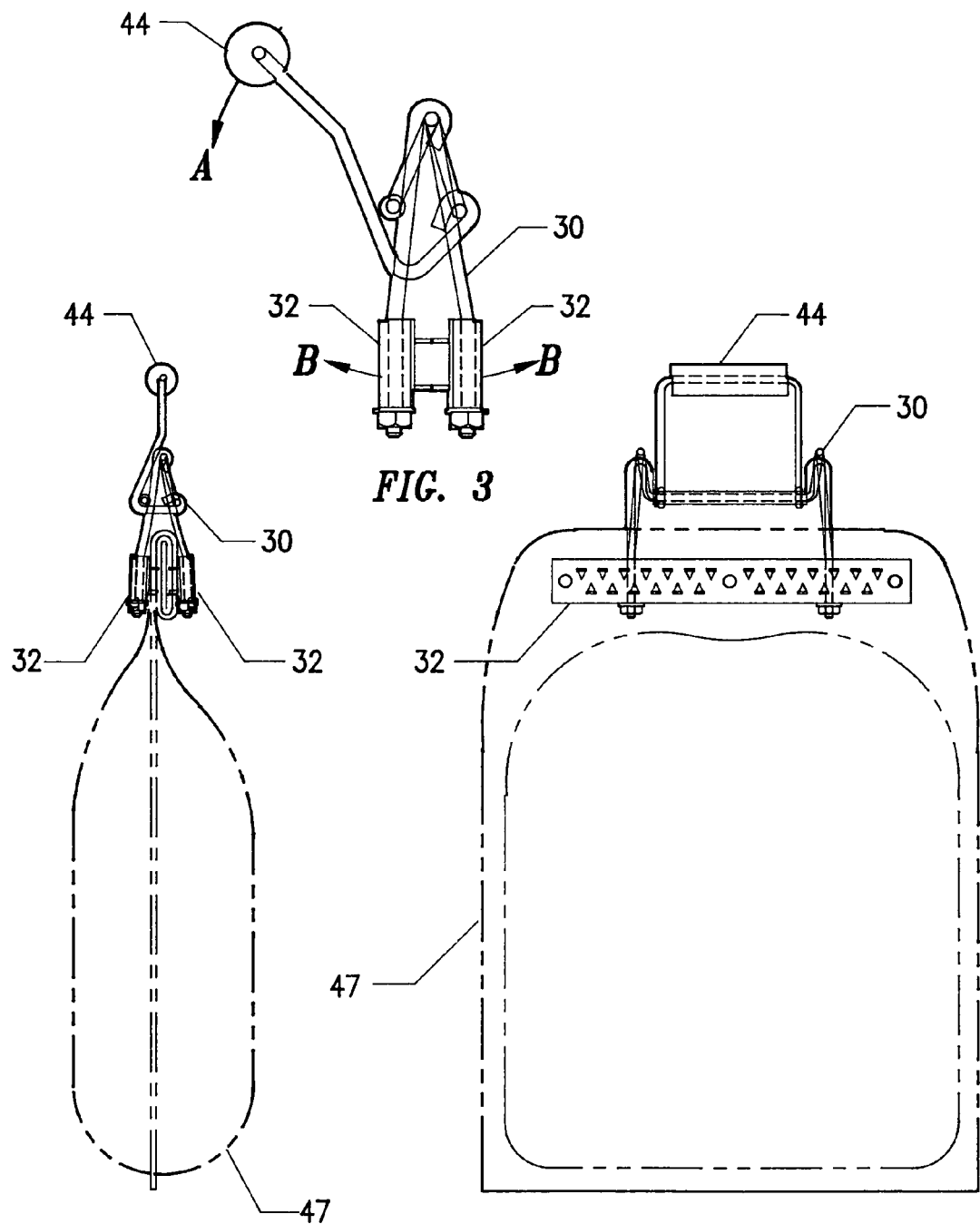

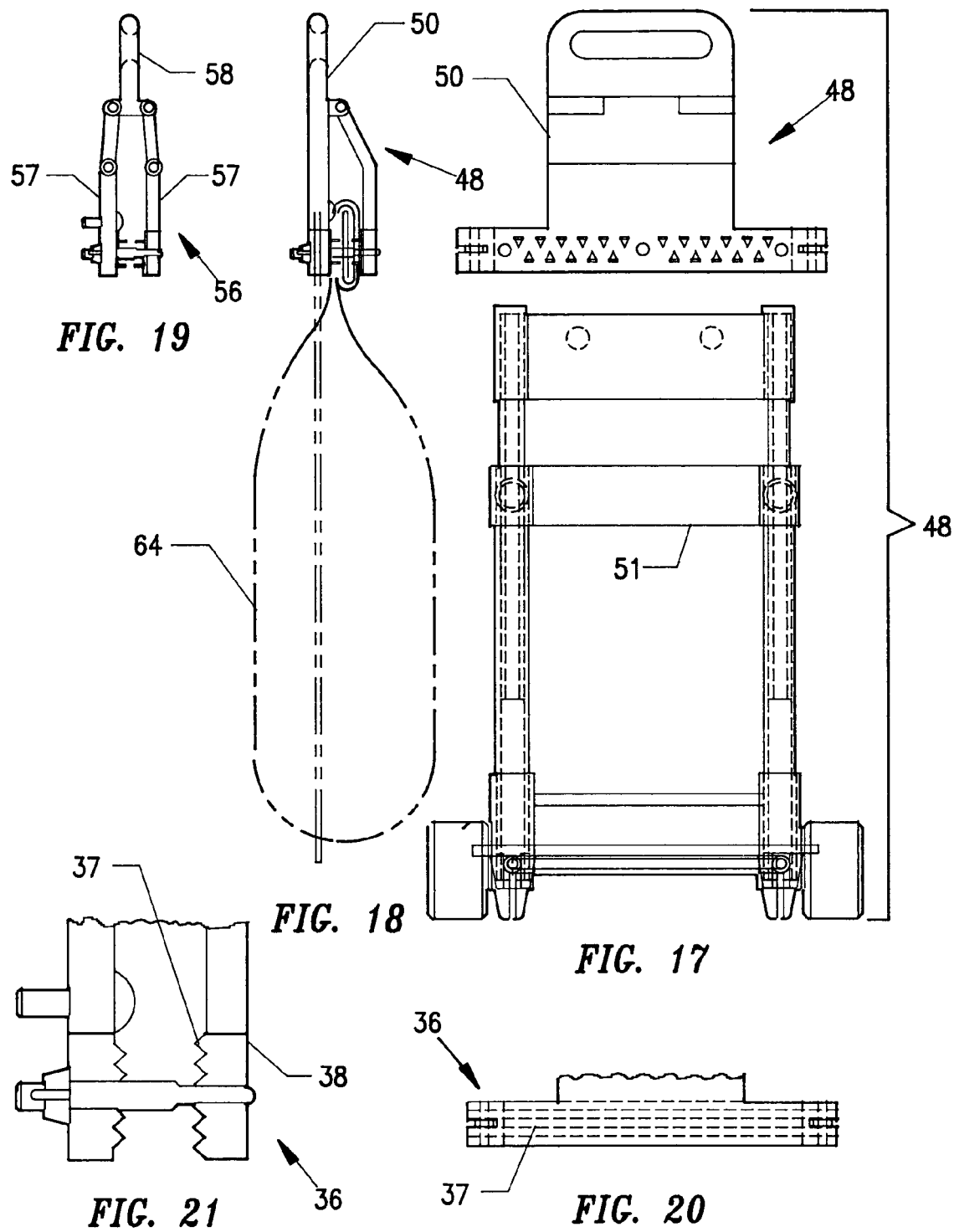

CART AND BAG CARRIER

This invention relates to hand carriers and more particularly to a unique hand carrier for transporting large bags filled with loose and granular materials.

BACKGROUND OF THE INVENTION

Although many loose and granular products such as fruit, vegetables, grains, salt, sand, trash, fertilizer, dog or cat food, potting soil, cement and the like are stored in large bags, little progress has been made in developing devices for carrying large bags, sacks and other deformable containers, filled with loose or granular materials. The common practices of carrying heavy bags by cradling, gripping and resting on shoulders are inefficient and frequently result in spillage, soiling of clothes and/or physical injuries. One of the principal drawbacks with the present procedures is a tendency to induce high stresses on muscles and vertebrae by elevating heavy bags. Moreover, the likelihood of spillage, spoilage and contamination increases when bags are opened and not securely closed.

In spite of the substantial progress and the considerable efforts and large sums expended in developing drugs and surgical procedures for treating muscle and back injuries, one area which has remained completely incapable of resolution, until the present invention, is the avoidance of muscle and back injuries by improvements in carrying heavy bags. A need exists for simple to use, effective devices for transporting heavy bags and sacks, partially or completely filled with loose or granular materials. This need is particularly urgent with elderly persons who constitute an increasing portion of the population and who must transport heavy bags from store to home or must lift to pour and use the contents of bags. Many women also have difficulty in lifting and transporting bags weighing 10 lbs. or more.

SUMMARY OF THE INVENTION

All of the drawbacks and difficulties encountered with prior practices are completely overcome with the present invention. In order to overcome these drawbacks, a dedicated bag and sack carrier is provided which is effective and easy to use. One benefit of the invention is that heavy bags and sacks need only to be elevated by an amount which is necessary to transport them. Another benefit is that the carrier can be used for sealing previously opened bags and sacks.

In employing the teaching of the present invention, a plurality of alternate constructions can be adopted to achieve the desired results and capabilities. In this disclosure, some alternate constructions are discussed. However, these embodiments are intended as examples and should not be considered as limiting.

In this invention, resides certain features which individually and collectively contribute to its ability to reduce injuries and spillage during the carrying of heavy bags and sacks containing loose or granular materials. In a first aspect of the invention the carrier is intended to be used in confined areas and for carrying light and moderately heavy bags and sacks. The carrier is comprised of a pair of elongated pivotally connected members for gripping upper portions of bags and sacks and a handle which is attached to the gripping members for carrying the bags and sacks in a suspended manner. At least one of the members has a plurality of small portions which protrude inwardly to grip the bags and sacks. An additional advantage is the ability to utilize the carrier as a secure closing device.

In a second aspect of the invention, the carrier is intended to be used for carrying heavy and/or large bags and sacks. The carrier is used in combination with a 2-wheel cart having an adjustable shelf for supporting the bottom of a bag or sack. The height of the cart is also adjustable such that different height bags can be supported on the shelf with upper bag portions held by the carrier. One feature of this aspect is that the carrier can be detached from the cart and used without the cart and if desired later reattached. Another feature is that the cart can be collapsed for storage, as its frame is adjustable and its shelf is foldable.

Further features and benefits will become apparent by reference to the drawings and ensuing detailed description of a preferred embodiment which discloses the best mode contemplated in carrying out the invention. The exclusive rights which are claimed are set forth in each of the numbered claims following the detailed description of the preferred embodiment.

BRIEF DESCRIPTION OF THE DRAWINGS

The invention will be better understood and further objects, characterizing features, details and advantages thereof will appear more clearly with reference to the diagrammatic drawings illustrating specific embodiments of the invention by way of non-limiting example only.

FIG. 1 is a front view of a bag and sack carrier showing a pair of gripping members in a locked condition.

FIG. 2 is a left side view of FIG. 1.

FIG. 3 is a left side view of a carrier showing the gripping members in an unlocked condition.

FIG. 4 is a cross-sectional view taken on the line 4-4 in FIG. 1.

FIG. 5 is a front view showing the bag carrier with a bag shown in phantom.

FIG. 6 is a right side view of FIG. 5.

FIG. 17 is an exploded view of the second embodiment.

FIG. 18 is a right side view of a third embodiment with a bag shown in phantom.

FIG. 19 is a right side view of a fourth embodiment.

FIG. 20 is a partial front view of a fifth embodiment.

FIG. 21 is an enlarged right side view of the fifth embodiment.

DETAILED DESCRIPTION OF THE PREFERRED EMBODIMENT

Figure 7:
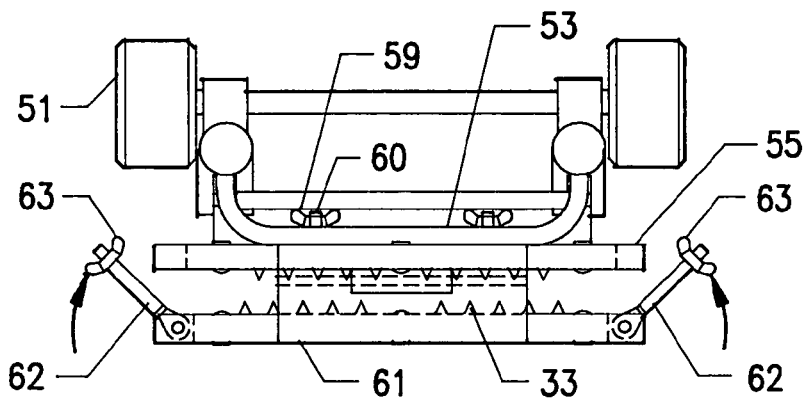
FIG. 7 is a plan view of a second embodiment of the present invention shown in a non-operative condition.

Referring now to the drawings wherein like numerals designate like and corresponding parts throughout the several views, a bag carrier 30, is shown in FIGS. 1 through 6, inclusive, according to the present invention.

One characteristic feature of the present invention is that portions of bags and sacks are clamped between jaws 32 having gripping surfaces 31. By way of example, in the embodiment of FIGS. 1 through 6, the gripping surfaces 31 of a pair of jaws 32 are surfaces having small protuberances, namely triangular tabs 33 which project inwardly between rectangular jaws 32. The gripping surfaces 31 generate high forces for preventing bags and sacks from being inadvertently separated from the carrier 30.

The rectangular jaws 32 are formed by riveting thin metal strips 34 to wood or plastic materials. The triangular tabs 33 are formed in stamping dies by shearing and bending triangular portions of the metal strips 34. Similar gripping surfaces may be formed by molding small protuberances by the usual manner in plastic jaws (not shown).

By way of further example, an alternate form of gripping surface 36 which is contemplated is shown in FIGS. 20 and 21 wherein a plurality of triangular ridges 37 extend along the length of one of the jaws 38.

The jaws 32 are attached to a pair of pivotally connected wire arms 39, 40. As shown in FIGS. 1 and 2, end portions of the arms 39, 40 extend through apertures in the jaws 32 and threadably engage nuts 41 which retain the arms 39, 40 in the jaws 32. The arms 39, 40 are comprised of spaced apart vertical side portions 42 and connecting top portions 43. A handle 44 which is pivotally attached to one of the arms 39 serves as a means for carrying a bag and a means for tightly clamping the jaws 32 on the bag.

The handle 44 is comprised of a wire portion 45 having end portions pivotally mounted on one 39 arm and a cylindrical wood or plastic hand portion 46 mounted on the wire portion 45. The clamping and releasing of the jaws 32 is best understood by reference to FIGS. 2 and 3. When the jaws 32 are clamped as shown in FIG. 2, the wire portion 45 of the handle 44 constrains the arms 39, 40 from separating from each other. With reference to FIG. 3, the jaws 32 are released by rotating the handle 44 in the direction "A", to allow the jaws 32 to separate from each other in the directions "B".

The manner of using the carrier 30 is shown in FIGS. 5 and 6 wherein the carrier 30 is clamped to a bag 47 drawn in phantom. After the jaws 32 are clamped on an upper portion of the bag 47, the bag 47 can be lifted or dragged along a surface with the handle 44. In this way, injuries are reduced since the bag 47 need only be lifted by a small amount or dragged without lifting along a surface.

Referring now to FIGS. 7 through 18, inclusive, a second aspect 48 of the invention is shown wherein a carrier 50, according to the invention, is combined with a 2-wheel cart 51. The 2-wheel cart 51 is comprised of a tubular frame 52, an upper bracket 53 for attaching the carrier 50 and a lower shelf 54 for supporting a lower end of a bag or sack. The height of the 2-wheel cart 51 and area of the shelf 54 are adjustable for storage and to accommodate differences in sizes of bags or sacks.

Figures 8, 9:
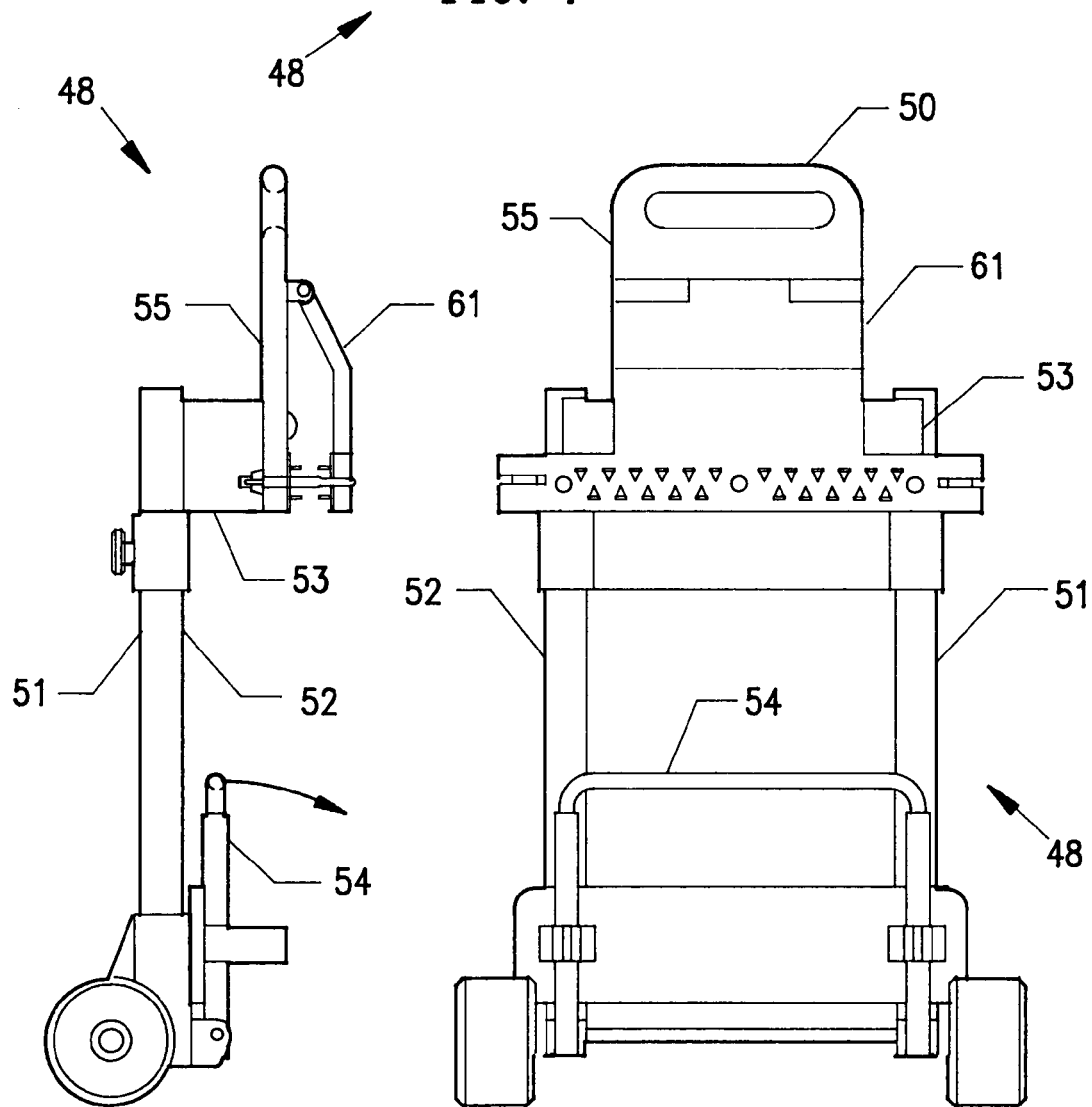
FIG. 8 is a front view of the second embodiment in the condition shown in FIG. 7.
FIG. 9 is a right side view of the second embodiment in the condition shown in FIG. 7.
Figures 10, 13:
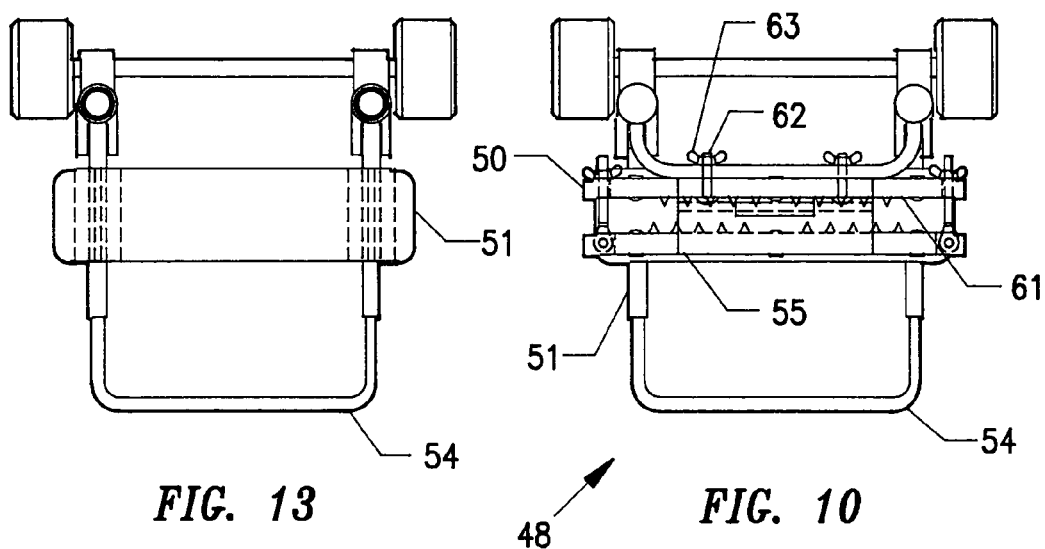
FIG. 10 is a plan view of the second embodiment shown in an alternate condition.
FIG. 13 is a cross-sectional view taken on the line 13-13 in FIG. 11.
Figures 11, 12:
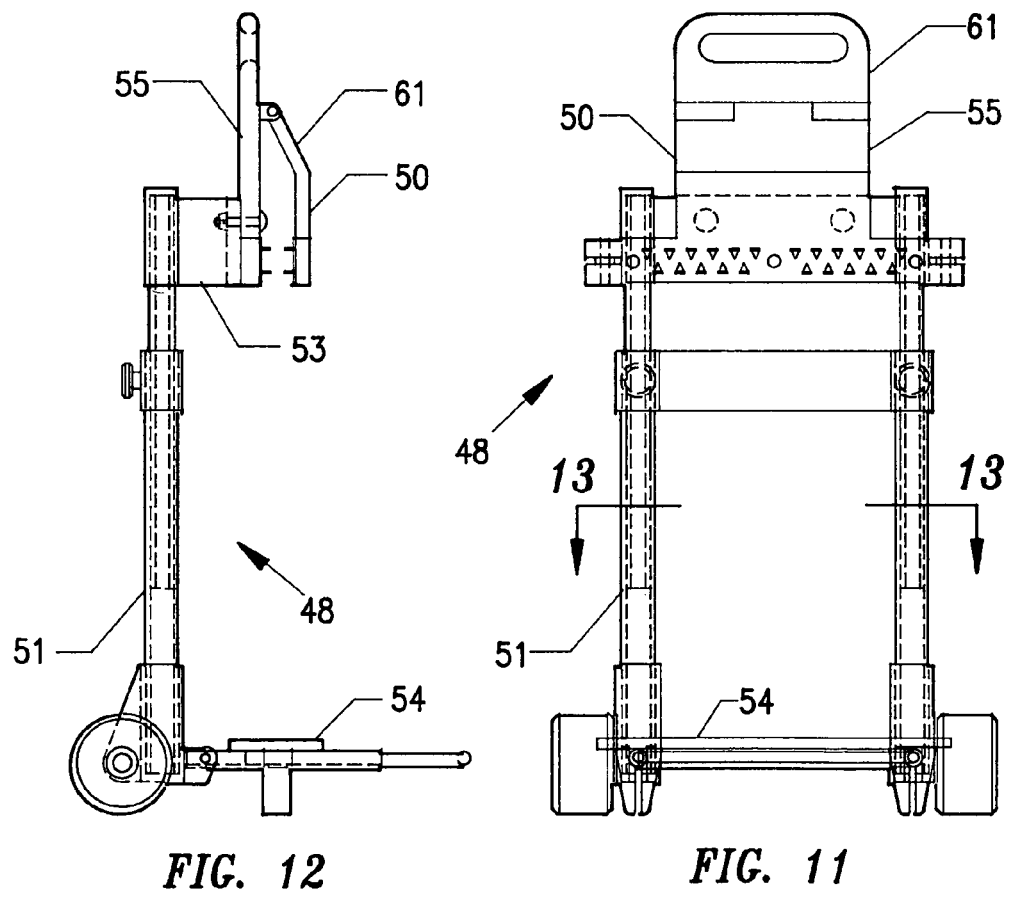
FIG. 11 is a front view of the second embodiment in the condition shown in FIG. 10.
FIG. 12 is a right side view of the second embodiment in the condition shown in FIG. 10.

The shelf 54 is telescopic and foldable from a vertical stored portion to a horizontal load supporting position. In this way, the cart 51 can be reduced in size, as shown in FIGS. 8 and 9, for storage in vehicle luggage compartments and used for transporting heavy bags and sacks to and from vehicles.

One of the carrier's jaws 55 serves as a handle and a bracket for attaching the carrier 50 to the cart 51. In FIG. 19, an alternate embodiment 56 is shown wherein a pair of jaws 57 is pivotally connected to a handle 58. With reference to FIGS. 7 and 9, the carrier 50 is attached to the cart 51 with a pair of bolts 59 and thumb nuts 60. As shown in 15, when the carrier 50 is detached from the cart 51, it can be independently used to transport bags.

The second jaw 61 is pivotally connected to the first mentioned jaw 55. Referring again to FIGS. 7 and 9, an alternate means for clamping jaws 55, 61 is disclosed wherein the jaws 55, 61 are clamped with eye bolts 62 and thumb screws 63.

Figures 14, 15, 16:
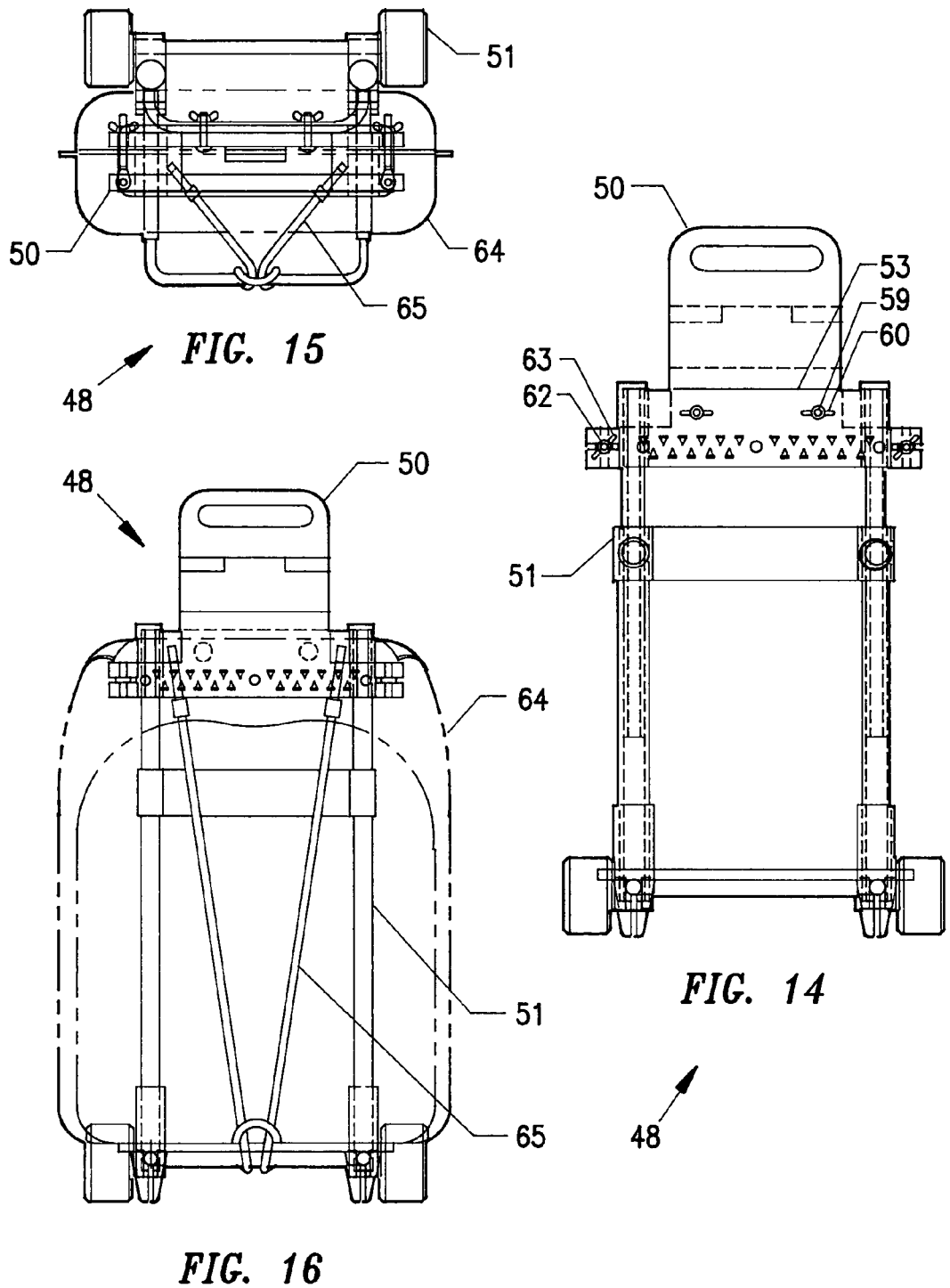
FIG. 14 is a rear view of the second embodiment in the condition shown in FIG. 10.
FIG. 15 is a plan view of the second embodiment with a bag shown in phantom.
FIG. 16 is a front view of the second embodiment with the bag shown in phantom.

The manner of using this embodiment 48 is illustrated in FIGS. 14 and 15 wherein the carrier 50 is clamped to an upper portion of a rather large bag 64 shown in phantom and the lower portion of the bag 64 is supported on the lower shelf 54. Additional retention of the bag is provided by an elastic bungee cord 65 which is attached to the lower shelf 54 and one of the clamps 61.

It will thus be seen that the objects set forth above, among those made apparent from the preceding description, are efficiently attained. Since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. In combination with a cart, a carrier mounted on an upper portion of said cart, said carrier having a pair of elongated jaws, and a means for clamping said jaws to an upper portion of said bag or sack, and a handle pivotally connected to both of said jaws.

2. The combination set forth in claim 1 wherein said cart is a 2-wheel cart.

3. The combination set forth in claim 1 wherein said cart has a lower shelf for supporting said bag or sack.

4. The combination set forth in claim 1 wherein said cart has a height which is adjustable.

5. The combination set forth in claim 1 wherein at least one of said jaws has a gripping surface for retaining and supporting said upper portion of said closed bag or sack.

6. The combination set forth in claim 2 wherein said carrier is detachable from said 2-wheel cart.

7. The combination set forth in claim 3 wherein said shelf is outwardly adjustable.

8. The combination set forth in claim 5 wherein said gripping surface of said jaw is comprised of a plurality of small outward extending portions for retaining and supporting said closed bag or sack.

9. The combination as set forth in claim 8 wherein said outward extending portions are triangular.

10. In combination with a cart for transporting closed bags or sacks, a bag carrier mounted on an upper portion of said cart for gripping an upper portion of a closed bag or sack, said carrier having a pair of elongated jaws for gripping and supporting a closed upper portion of said bag or sack, and a means for clamping said jaws to and releasing said jaws from an upper portion of said closed bag or sack, and a handle attached to at least one of said jaws, said means for clamping said carrier to said bag or sack comprises a pair of bolts, each having one end portion pivotally attached to an end portion of one of said jaws and a thumb nut for engaging an opposite end portion of another of said jaws.

\* \* \* \* \*